United States Patent
Han et al.

(10) Patent No.: US 11,623,437 B2
(45) Date of Patent: Apr. 11, 2023

(54) EXTERIOR PANEL FOR HOME APPLIANCE AND METHOD OF MANUFACTURING THE SAME

(71) Applicant: LG Electronics Inc., Seoul (KR)

(72) Inventors: Doyoun Han, Seoul (KR); Youngwoo Kim, Seoul (KR); Hyesun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 17/040,741

(22) PCT Filed: Mar. 8, 2019

(86) PCT No.: PCT/KR2019/002766
§ 371 (c)(1),
(2) Date: Sep. 23, 2020

(87) PCT Pub. No.: WO2019/182275
PCT Pub. Date: Sep. 26, 2019

(65) Prior Publication Data
US 2021/0016556 A1    Jan. 21, 2021

(30) Foreign Application Priority Data
Mar. 23, 2018 (KR) .................. 10-2018-0033835

(51) Int. Cl.
*B32B 37/24* (2006.01)
*B32B 7/12* (2006.01)
(Continued)

(52) U.S. Cl.
CPC ............. *B32B 37/24* (2013.01); *B32B 7/12* (2013.01); *B32B 15/08* (2013.01); *B32B 15/18* (2013.01);
(Continued)

(58) Field of Classification Search
CPC .......... B32B 37/24; B32B 7/12; B32B 15/08; B32B 15/18; B32B 37/12; B32B 38/0004;
(Continued)

(56) References Cited

U.S. PATENT DOCUMENTS 6,720,065 B1 * 4/2004 Cosentino ............... B32B 15/08
428/323
2003/0029831 A1 * 2/2003 Kawase ............... H01L 51/5206
216/27
(Continued)

FOREIGN PATENT DOCUMENTS

JP    H04140137    5/1992
JP    H08118539  * 5/1996
(Continued)

OTHER PUBLICATIONS

Machine Translation (EPO/Google) of the Description of Dainippon Printing Co., LTD, JPH04140137A, published May 14, 1992, made of record by Applicant in the IDS filed Sep. 23, 2020. (Year: 2022).*
(Continued)

*Primary Examiner* — Cynthia L Schaller
(74) *Attorney, Agent, or Firm* — Fish & Richardson P.C.

(57) ABSTRACT

The present disclosure relates to an exterior panel for a home appliance and a method of manufacturing the same.
The exterior panel for a home appliance according to one aspect includes: a base layer made of a metal material, a deposition layer formed at a center except for an edge of an upper layer of the base layer and made of a metal material, and a coating layer formed on the deposition layer and an upper surface of the edge of the base layer, on which the deposition layer is not formed.

20 Claims, 5 Drawing Sheets

(51) Int. Cl.
*B32B 15/08* (2006.01)
*B32B 15/18* (2006.01)
*B32B 37/12* (2006.01)
*B32B 38/00* (2006.01)
*B32B 38/16* (2006.01)

(52) U.S. Cl.
CPC .......... *B32B 37/12* (2013.01); *B32B 38/0004* (2013.01); *B32B 38/145* (2013.01); *B32B 38/162* (2013.01); *B32B 2037/246* (2013.01); *B32B 2255/06* (2013.01); *B32B 2255/205* (2013.01); *B32B 2509/00* (2013.01)

(58) Field of Classification Search
CPC ................ B32B 38/145; B32B 38/162; B32B 2037/246; B32B 2255/06; B32B 2255/205; B32B 2509/00; B32B 38/10; B32B 2607/00; B44C 5/0415; B44C 3/005
See application file for complete search history.

(56) References Cited

U.S. PATENT DOCUMENTS

2010/0310887 A1* 12/2010 Kim .......................... B44C 1/10
428/426
2011/0318545 A1 12/2011 Goto et al.

FOREIGN PATENT DOCUMENTS

| JP | 2003145673 | | 5/2003 |
| JP | 2012011596 | | 1/2012 |
| KR | 20000049764 A | * | 5/2000 |
| KR | 1020030046599 | | 6/2003 |
| KR | 1020100054116 | | 5/2010 |
| KR | 1020130006959 | | 1/2013 |

OTHER PUBLICATIONS

KR20000049764A Machine Translation of Description (Year: 2022).*
JPH08118539 Machine Translation of Description (Year: 2022).*

* cited by examiner

EXTERIOR PANEL FOR HOME APPLIANCE AND METHOD OF MANUFACTURING THE SAME

CROSS-REFERENCE TO RELATED APPLICATIONS

This application is a National Stage application under 35 U.S.C. § 371 of International Application No. PCT/KR2019/002766, filed on Mar. 8, 2019, which claims the benefit of Korean Patent Application No. 10-2018-0033835, filed on Mar. 23, 2018. The disclosures of the prior applications are incorporated by reference in their entirety.

TECHNICAL FIELD

The present disclosure relates to an exterior panel for a home appliance and a method of manufacturing the same.

BACKGROUND

In recent years, exterior panels applied to home appliances such as refrigerators and washing machines have been manufactured to show the texture of metal in order to give aesthetic effects.

In addition, generally, a metal layer and a coating layer are formed on an upper surface of a base layer.

Korean Unexamined Patent Publication No. 10-2010-0054116 discloses "non-deposition mirror color coating material".

FIG. 1 is a cross-section view of a conventional non-deposition mirror color coating material.

Referring to FIG. 1, the non-deposition mirror color coating material includes a base 1, a lower coating layer 2 formed on the base 1, a mirror color coating layer 3 formed on the lower coating layer 2 and an upper coating layer 4 formed on the mirror color coating layer 3.

The coating layers 2, 3 and 4 may be formed by a paining process and thus may be manufactured by a vary simple process. That is, after the lower coating layer 2 is first applied to the base 1, the mirror color coating layer 3 is applied thereto, and then the upper coating layer 4 is applied thereto, thereby implementing mirror color.

In the above case, a mirror color is very excellent in terms of design and luminance as compared to the case where silver lacquer is applied and then an ultraviolet curing resin composition is applied without a lower coating layer, and design and luminance similar to that of deposition may be implemented.

However, in the above case, the cross-section of a metal deposition layer is exposed to the outside, causing the deposition layer to be discolored due to detergent, moisture and foreign materials. In addition, metal applied to deposition may be discolored by detergent.

In addition, in the winter, the deposition layer and a film layer may be peeled due to shrinkage of a film of vinyl coated metal (VCM). In the conventional case, the deposition layer and the film layer are seated only by deposition rather than bonding and adhesion and thus have weak bonding strength and may be easily peeled.

SUMMARY

The present disclosure is devised to solve the above-described problems and an object of the present disclosure is to provide an exterior panel for a home appliance, in which a cross-section of a metal deposition portion is not exposed to the outside to prevent discoloration and peeling of a deposition layer due to moisture and foreign materials, and a method of manufacturing the same.

Another object of the present disclosure is to provide an exterior panel for a home appliance capable of maintaining a lamination state of a film and a metal layer without separation by removing a deposition layer at a boundary portion to directly bond the metal layer to the film and secure bonding force at the boundary portion, and a method of manufacturing the same.

Another object of the present disclosure is to provide an exterior panel for a home appliance capable of implementing a sense of unity of materials by printing a material having a color and texture similar to those of a metal deposition layer at a boundary portion even if the metal deposition layer is removed from the boundary portion, and a method of manufacturing the same.

An exterior panel for a home appliance includes a base layer made of a metal material, a deposition layer formed at a center except for an edge of an upper layer of the base layer and made of a metal material, and a coating layer formed on the deposition layer and an upper surface of the edge of the base layer, on which the deposition layer is not formed.

In addition, a printing layer may be formed on the edge of the base layer, on which the deposition layer is not formed, and the coating layer may be formed on an upper surface of the printing layer.

In addition, the printing layer may include a silver material.

In addition, the base layer may include a metal layer, and an adhesive layer formed on an upper surface of the metal layer.

In addition, the metal layer may be formed of a galvanized steel sheet (GI).

In addition, the deposition layer and the printing layer may have the same or similar color.

In addition, hairlines may be processed on the base layer or the coating layer.

A method of manufacturing an exterior panel for a home appliance includes printing a predetermined pattern on one surface of a film using a strippable paint, depositing a metal layer on an entire layer of the film on which the pattern is printed, removing the strippable paint formed on the film and the metal layer deposited on an upper layer thereof, and laminating a base layer on one surface of the film.

In addition, the printing may include printing a pattern made of a silver material on one surface of the film and printing the strippable paint on an upper surface of the silver pattern.

In addition, the method may further include, before the printing, processing hairlines on the film.

In addition, the removing may be performed using a washing method.

In addition, the removing may be performed by attaching an adhesive tape to the strippable paint and the metal layer deposited on an upper surface thereof and then detaching the adhesive tape.

In addition, the removing may be performed by performing immersion in an etching solution after masking.

In addition, after the removing, a first coating step of coating an upper surface of the metal layer with a primer and a second coating step of coating an upper surface of the base layer with a laminate adhesive may be performed and the laminating may be performed.

In addition, after the laminating, the film may be cut by units.

According to an exterior panel for a home appliance and a method of manufacturing the same of the present disclosure, a cross-section of a metal deposition portion is not exposed to the outside to prevent discoloration and peeling of a deposition layer due to moisture and foreign materials.

In addition, it is possible to maintain a lamination state of a film and a metal layer without separation by removing a deposition layer at a boundary portion to directly bond the metal layer to the film and secure bonding force at the boundary portion.

In addition, it is possible to implement a sense of unity of materials by printing a material having a color and texture similar to those of a metal deposition layer at a boundary portion even if the metal deposition layer is removed from the boundary portion.

DETAILED DESCRIPTION

Hereinafter, embodiments of the present disclosure will be described in detail with reference to the accompanying drawings.

Figure 1:
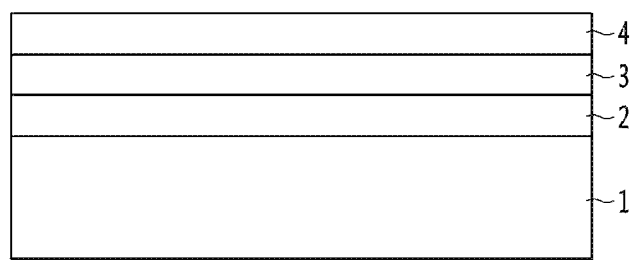
FIG. 1 is a cross-sectional view of a conventional non-deposition mirror color coating material.
Figure 2:
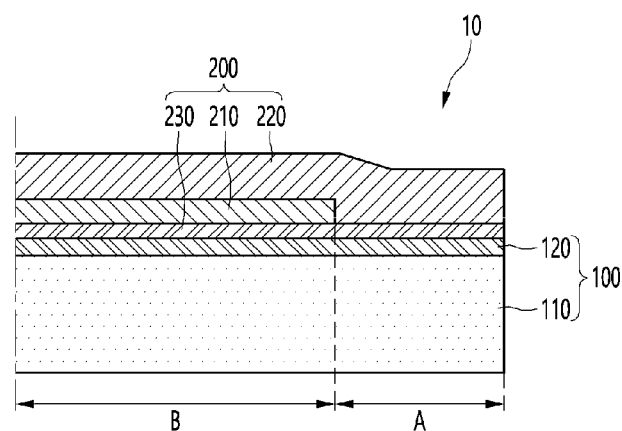
FIG. 2 is a cross-sectional view of an exterior panel for a home appliance according to an embodiment of the present disclosure.
Figure 3:
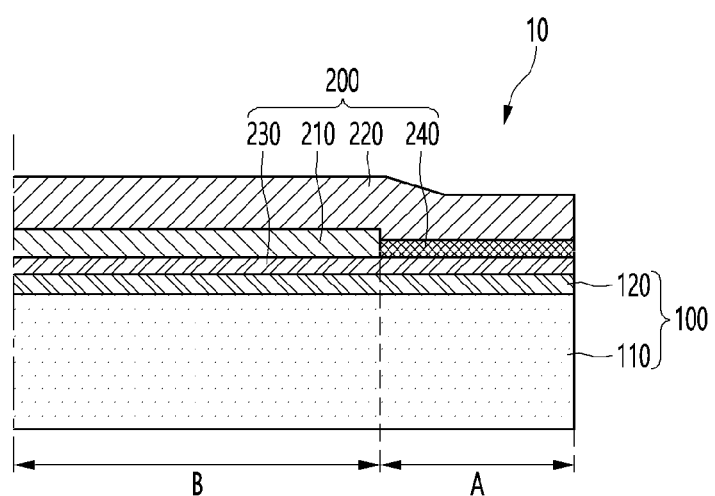
FIG. 3 is a cross-sectional view of an exterior panel for a home appliance according to another embodiment of the present disclosure.

FIG. 2 is a cross-sectional view of an exterior panel for a home appliance according to an embodiment of the present disclosure. FIG. 3 is a cross-sectional view of an exterior panel for a home appliance according to another embodiment of the present disclosure.

Referring to FIGS. 2 and 3, the exterior panel 10 for the home appliance according to the present disclosure is applicable to home appliances such as refrigerators or washing machines, and includes a base layer 100, at least some of which are made of a metal material, a deposition layer 210 formed on a center (section B of FIG. 2) except for the edge (section A of FIG. 3) of the upper surface of the base layer 100 and made of a metal layer, and a coating layer 220 formed on the deposition layer 210 and the upper surface of the edge (section A of FIG. 2) of the base layer 100, on which the deposition layer 210 is not formed.

In the above case, in the center (section B of FIG. 2) of the exterior panel 10 for the home appliance according to the present disclosure, the base layer 100, the deposition layer 210 and the coating layer 220 are sequentially laminated. However, in the edge (section A of FIG. 2), the base layer 100 and the coating layer 220 may be laminated.

However, in the above case, colors of a portion in which the deposition layer 210 is formed and a portion in which the deposition layer 210 is not formed may be different.

Accordingly, a printing layer 240 may be formed in the edge (section A of FIG. 3) of the base layer 100, on which the deposition layer 210 is not formed. In addition, the coating layer 220 may be formed on the upper surface of the printing layer 240.

The printing layer 240 may have a color equal or similar to that of the deposition layer 210 and may have texture similar to that of the deposition layer 210.

Accordingly, when viewed from the outside (the upper side of the coating layer), the center (section B of FIG. 3) in which the deposition layer 210 is formed and the edge (section A of FIG. 3) in which the deposition layer 210 is not formed look like one material without being distinguished therebetween.

In the above case, in the center (section B of FIG. 3) of the exterior panel 10 for the home appliance, the base layer 100, the deposition layer 210 and the coating layer 220 may be laminated. However, in the edge (section A of FIG. 3), the base layer 100, the printing layer 240 and the coating layer 220 may be laminated.

For example, the printing layer 240 may be made of a silver (Ag) material.

Meanwhile, the base layer 100 includes a metal layer 110 made of a metal material and an adhesive layer 120 formed on an upper surface of the metal layer 110.

The adhesive layer 120 may be formed on the upper surface of the metal layer 110.

The adhesive layer 120 is provided to secure bonding force with the deposition layer 210.

In addition, a primer layer 230 reacting with the adhesive layer 120 to improve adhesion may be formed on a bottom surface (surface in contact with the adhesive layer) of the deposition layer 210.

Therefore, the metal layer 110 and the deposition layer 210 may be bonded with high bonding force.

Meanwhile, the metal layer 110 may be formed of a galvanized steel sheet (GI).

In addition, the deposition layer 210 may be formed of aluminum Al, stainless steel (SUS), nickel (Ni), chrome (Cr), indium (In), etc.

In addition, the deposition layer 210 may be formed by depositing a single metal or multiple metals.

In addition, the deposition layer 210 may be formed using any deposition method such as E-beam type, sputtering type, thermal type, CVD or PVD or plating method.

Meanwhile, hairlines may be processed in the base layer 100 or the coating layer 220.

As described above, when a plurality of thin solid hairlines is processed, the texture of the exterior panel 10 may increasingly look like metal when viewed from the outside (the upper side of the coating layer).

Figure 4:
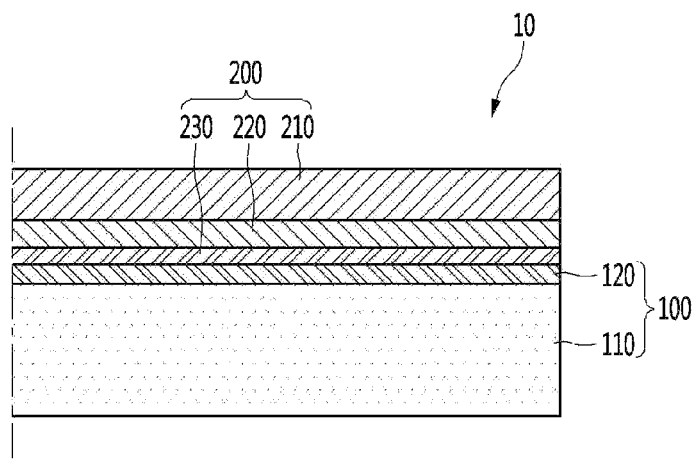
FIG. 4 is a cross-sectional view of an exterior panel for a home appliance, in which a deposition layer at a boundary portion is not removed.

FIG. 4 is a cross-sectional view of an exterior panel for a home appliance, in which a deposition layer at a boundary portion is not removed.

Referring to FIG. 4, it can be seen that, since the deposition layer is not removed at the boundary portion, the cross-section of the deposition layer 210 is exposed to the outside.

In this case, the deposition layer 210 may be discolored due to moisture and foreign materials. In addition, metal applied to deposition is discolored by detergent.

In addition, in the winter, the deposition layer 219 and the coating layer 220 may be peeled due to shrinkage of the coating layer 220 made of the film. In the conventional case, the deposition layer 210 and the coating layer 220 are seated only by deposition rather than bonding and adhesion and thus have weak bonding strength and may be easily peeled.

In contrast, in the present disclosure, as shown in FIGS. 2 and 3, the deposition layer 210 at the boundary portion is removed such that the cross-section of the deposition layer 210 is not exposed to the outside, thereby preventing the deposition layer from being discolored and peeled due to moisture and foreign materials.

In addition, as the deposition layer 210 at the boundary portion is removed, the metal layer 110 is directly bonded to the coating layer 220 in the form of the film and thus bonding force is secured at the boundary portion. Therefore, even if the coating layer 220 is shrunk, the coating layer 220 and the metal layer 110 may be maintained in the laminated state without being separated.

Further, even if the deposition layer 210 is removed at the boundary portion, the printing layer 240 having a color similar to that of the deposition layer 210 is formed in the region from which the deposition layer 210 is removed, thereby realizing a sense of unity of the material.

Hereinafter, a method of manufacturing an exterior panel for a home appliance having the above structure will be described.

Figure 5:
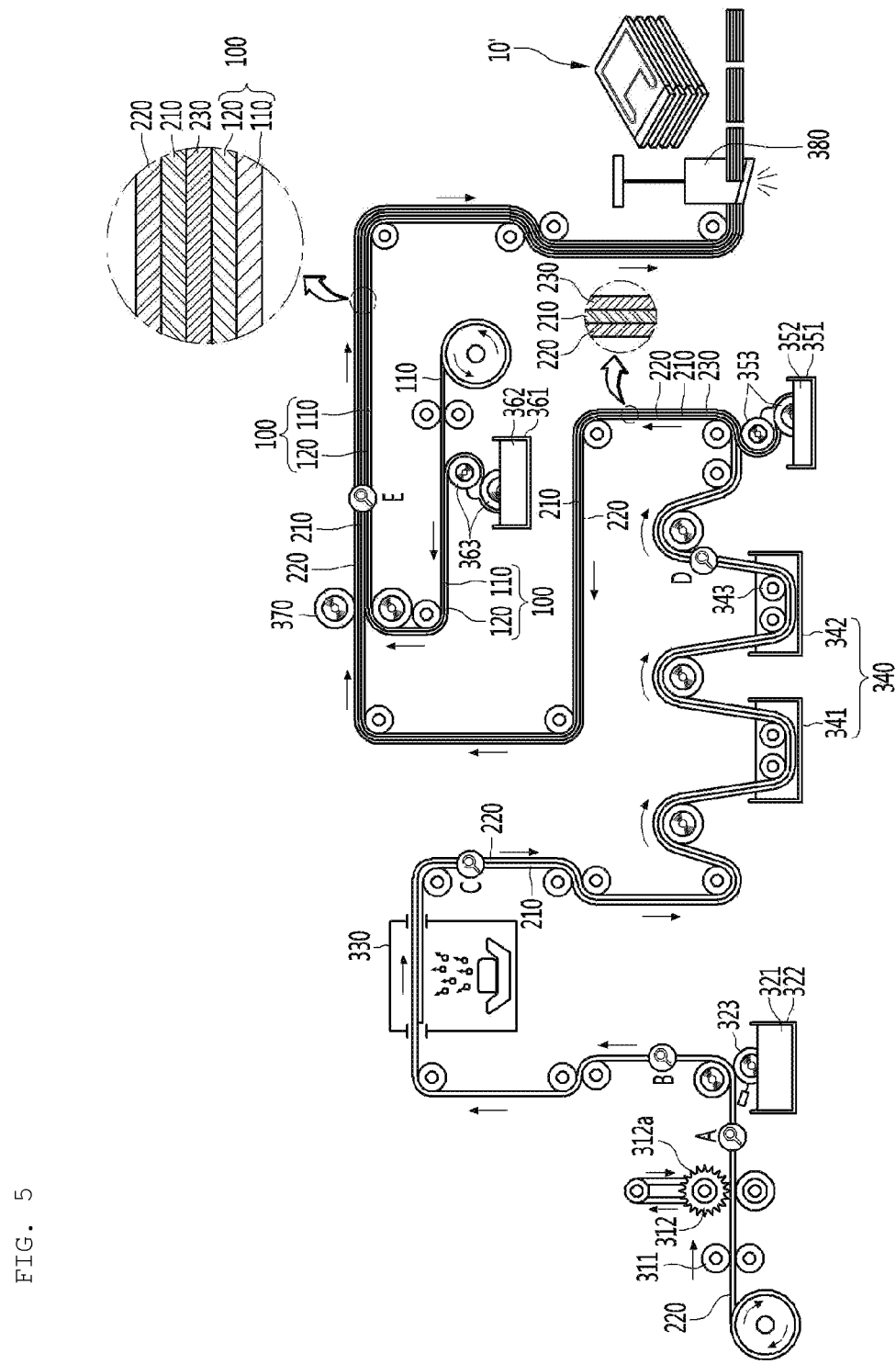
FIG. 5 is a view showing the concept of a method of manufacturing an exterior panel for a home appliance according to an embodiment of the present disclosure.
Figure 6:
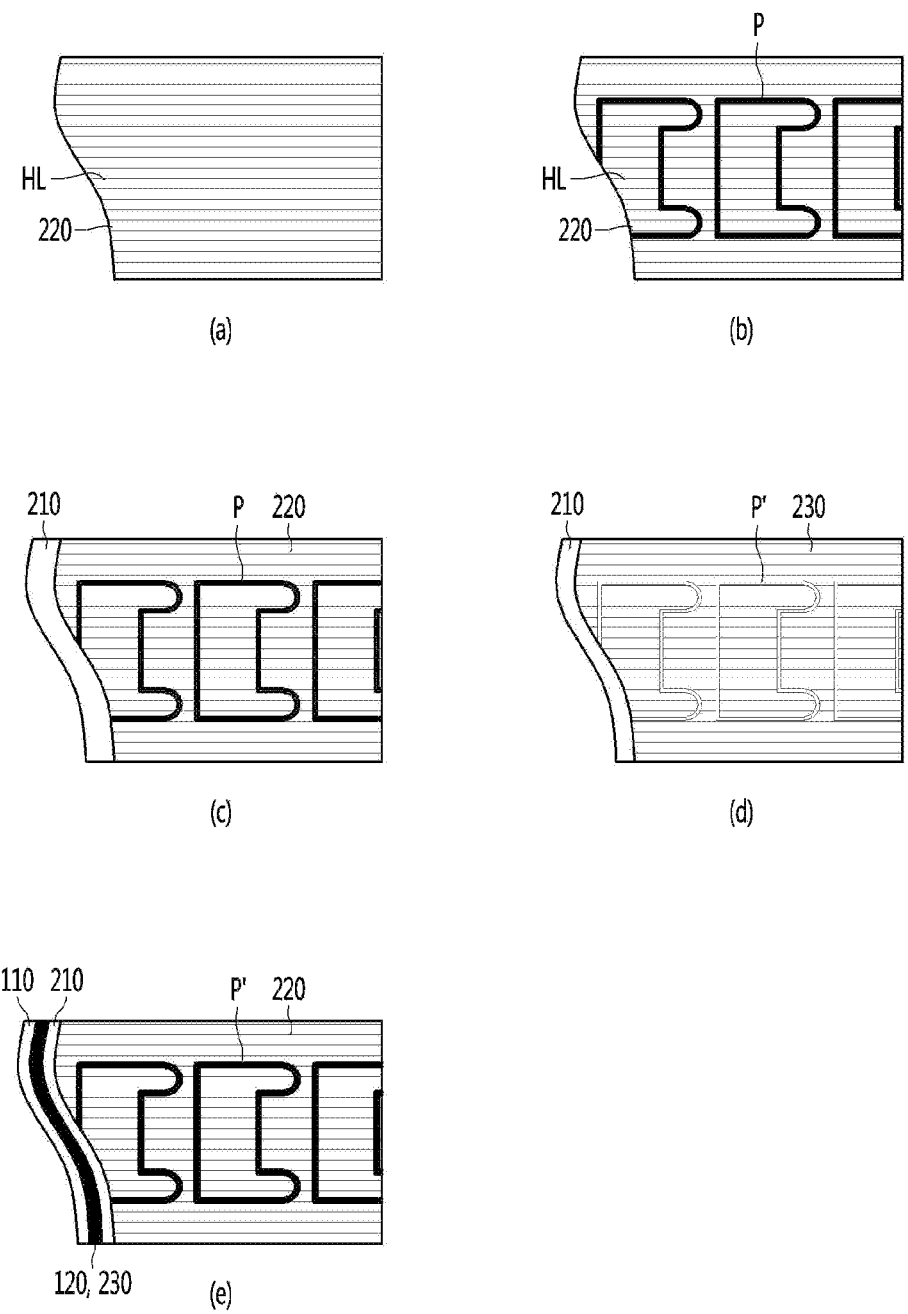
FIGS. 6 to 7 are cross-sectional views of a laminated body of each step in the method of manufacturing the exterior panel for the home appliance.
Figure 7:
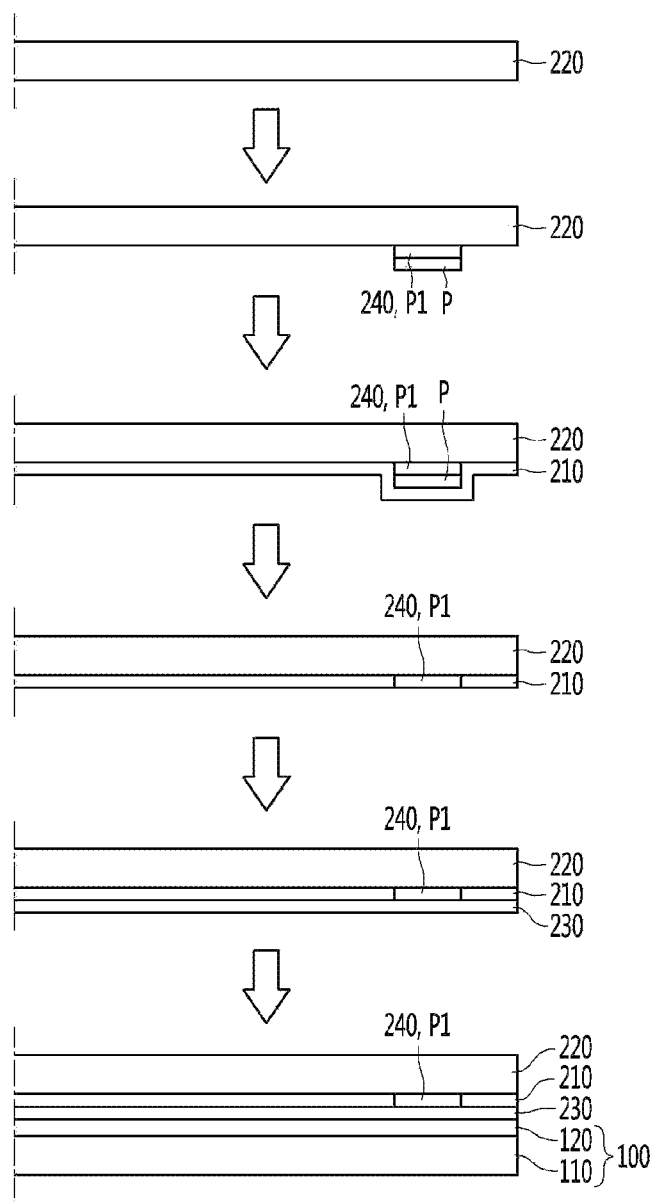

FIG. 5 is a view showing the concept of a method of manufacturing an exterior panel for a home appliance according to an embodiment of the present disclosure. FIGS. 6 to 7 are cross-sectional views of a laminated body of each step in the method of manufacturing the exterior panel for the home appliance.

For reference, the below-described film means the above-described coating layer 220.

Referring to FIGS. 5 and 6, the method of manufacturing the exterior panel for the home appliance according to the present disclosure includes a printing step, a deposition step, a removal step and a lamination step.

First, the printing step means step of printing a predetermined pattern P using a strippable paint on one surface of a film 220. In addition, the deposition step means step of depositing the deposition layer 210 on one entire surface of the film 220 on which the pattern is printed in the printing step. In addition, the removal step means step of removing the pattern P formed on the film 220 and the deposition layer 210 deposited on the upper surface of the pattern P using the strippable paint while passing through the deposition step. In addition, the lamination step means step of laminating the base layer 100 on one surface of the film 220 which has passed through the removal step.

Hereinafter, an example of the method of manufacturing the exterior panel for the home appliance will be described with reference to FIGS. 5 to 6.

First, the film 220 may be formed of a transparent material. In addition, the film 220 may be wound in the form of a roll.

In this state, the film 220 is unwound and moved in a state of being maintained in the form of a plane by a guide roller 311.

At this time, the film 220 moved in the form of the plane may selectively proceed to a processing step of processing hairlines prior to the printing step.

To this end, the film 220 may pass through a processing roller 312 for processing hairlines. The processing roller may rotate in connection with a power source and have a plurality of processing pins or cutters 312a on a surface thereof.

The processing step may be omitted in some cases.

Referring to (a) of FIG. 6, it can be seen that the hairlines HL are processed on the film 220.

As described above, when the plurality of thin solid hairlines is processed, the exterior panel 10 may increasingly look like metal when viewed from the outside (the upper side of the coating layer).

Thereafter, the strippable paint is printed on one surface (lower surface) of the film 220. The strippable paint will be peeled later.

For example, by a printing roller 323 rotating in a state in which at least a portion is in contact with a container 322 in which the strippable paint 321 is contained, the strippable paint may be printed on one surface (lower surface) of the film 220 with a predetermined pattern P. Here, the shape of the pattern P may be equal or similar to that of the finally completed exterior panel for the home appliance. When the exterior panel has a rectangular shape, the pattern P may also have a rectangular shape.

Referring to (b) of FIG. 6, it can be seen that the pattern P is formed by printing the strippable paint on the film 220. The pattern P forms a boundary line of the finally completed exterior panel for the home appliance.

Thereafter, the deposition layer 210 is deposited on one surface (lower surface) of the film 220, on which the pattern P is formed.

Specifically, by heating and evaporating metal at an inner lower side of a vacuum chamber 330 while the film 220 passes into the vacuum chamber 330, metal is adhered to one surface (lower surface) of the film, on which the pattern P is formed, as a thin film.

The deposition layer 210 may be formed using any deposition method such as E-beam type, sputtering type, thermal type, CVD or PVD or plating method.

Referring to (c) of FIG. 6, it can be seen that the deposition layer 210 is deposited on one surface (lower surface) of the film 220, on which the pattern P is formed.

When the deposition layer 210 is deposited on one surface (lower surface) of the film 220, on which the pattern P is formed, using the above-described method, the film 220 moves to a washing tub 340 along the guide roller.

Thereafter, the pattern P printed on one surface of the film 220 by the strippable paint and the deposition layer 210 deposited on the upper surface of the pattern P are removed while passing at least one washing tub 340.

Specifically, the pattern P printed by the strippable paint and the deposition layer 210 deposited on the upper surface of the pattern P may be removed while the film 220, on which the deposition layer 210 is formed, passes through a first washing tub 341 and a second washing tub 342.

Referring to (d) of FIG. 6, the film 220, which has passed through the washing tub 340, is in a state in which the deposition layer 210 is deposited on one surface (lower surface) thereof, but the strippable paint and the deposition layer 210 of a portion in which the pattern P' was formed are removed.

In addition, the removal step may be performed by attaching an adhesive tape to one surface (lower surface) of the deposition layer 210 and detaching the adhesive tape. At this time, the strippable paint printed on one surface of the film 220 and the deposition layer 210 deposited on the upper surface thereof may be removed from the film 220 along with the adhesive tape.

In addition, the removal step may be performed by masking the remaining region except for the pattern P and then performing immersion in an etching solution. At this time, the strippable paint printed in the region of the pattern P and the deposition layer 210 deposited on the upper surface thereof, both of which are not masked, may be removed.

When the pattern P is removed, the lamination step of laminating the film 220, on which the deposition layer 210 is formed, and the base layer 100 is performed.

At this time, to secure bonding force between the base layer 100 and the deposition layer 210, an adhesive may be formed between the base layer 100 and the deposition layer 210.

To this end, after the removal step and before the lamination step, a first coating step of coating one surface (lower surface) of the deposition layer 210 with a primer to form a primer layer 230 may be performed.

Specifically, while a roller 353 having at least a portion immersed in a container 351 in which the primer 352 is contained, rotates, one surface (lower surface) of the deposition layer 210 passing through the upper portion thereof may be coated with the primer, thereby forming the primer layer 230.

In addition, after the removal step and before the lamination step, a second coating step of coating one surface (lower surface) of the metal layer 110 forming the base layer 100 with a laminate adhesive to form the adhesive layer 120 may be performed.

Specifically, while a roller 363 having at least a portion immersed in a container 361 in which the laminate adhesive 362 is contained rotates, one surface (lower surface) of the metal layer 110 passing through the upper portion thereof may be coated with the laminate adhesive, thereby forming the adhesive layer 120.

For reference, the metal layer 110 may be wound in the form of a roll.

In this state, the metal layer 110 is unwound and moved in a state of being maintained in the form of a plane by a guide roller, thereby forming the adhesive layer 120.

As described above, the primer layer 230 is formed on one surface (lower surface) of the deposition layer 210, and the metal layer 110 and the film 220 pass through a pressurization roller 370 such that the primer layer 230 and the adhesive layer 120 are brought into contact with each other in a state in which the adhesive layer 120 is formed on one surface (lower surface) of the metal layer 110, thereby securing adhesive force while the primer layer 230 and the adhesive layer 120 react with each other and laminating the film 220 and the metal layer 110.

Referring to (e) of FIG. 6, the base layer 100 includes the metal layer 110, and the primer layer 230 and the adhesive layer 120 are formed between the metal layer 110 and the deposition layer 210. Therefore, the metal layer 110 may be laminated with the deposition layer 210 and the film 220 in the form of one panel.

Meanwhile, after the lamination step, a cutting step of cutting the panel in which the metal layer 110 and the film 220 are laminated may be performed.

Specifically, the panel in which the metal layer 110, the adhesive layer 120, the primer layer 230, the deposition layer 210 and the film 220 are laminated is produced and is cut by a cutter 380 into unit bodies 10' having a constant length.

The cut unit body 10' may be cut once again later along the boundary of the pattern P.

In addition, a bending process of bending a portion in which the pattern P is formed may be additionally performed. Therefore, the portion in which the pattern P is formed is not exposed when viewed from a surface facing the exterior panel 10.

In addition, in the case of the portion in which the pattern P is formed, the deposition layer 210 is removed and, when viewed from the outside, at least a portion of the metal layer 110 may be exposed to the outside through the portion in which the pattern P is formed.

In this case, the deposition layer 210 and the metal layer 110 are distinguished, thereby deteriorating a sense of unity and an external aesthetic sense.

Accordingly, the printing layer 240 is formed at a position where the deposition layer 210 is not formed, that is, a position where the pattern P was formed.

The printing layer 240 may have a color equal or similar to that of the deposition layer 210 and may have texture similar to that of the deposition layer 210.

Accordingly, when viewed from the outside (the upper side of the coating layer), the deposition layer 210 and the printing layer 240 may look like one material.

Referring to FIG. 7, as described above, in order to form the printing layer 240, in the printing step, a pattern P1 made of silver may be primarily printed on one surface of the film 220 and the pattern P of the strippable paint may be printed on the upper surface of the pattern P1 made of silver.

In this case, in the removal step, even if the pattern P of the strippable paint and the deposition layer 210 deposited on the upper surface thereof are removed, the pattern P1 made of silver and printed on the film 220 may remain on the film 220.

In this state, when one surface (lower surface) of the deposition layer 210 and the printing layer 240 P1 may be coated with the primer layer 230 and the adhesive layer 120 applied on one surface (upper surface) of the metal layer 110 and the primer layer 230 are bonded, the metal layer 110 and the film 220 are laminated and the deposition layer 210 is laminated in the center therebetween, and the printing layer 240 P1 may be laminated at the boundary portion.

According to the present disclosure, during assembling of a product, the strippable paint is applied to the boundary portion which is not exposed to the outside and metal deposition is omitted at the boundary portion, thereby directly bonding the film 220 to the metal layer 110. Accordingly, it is possible to prevent the metal deposition layer 210 formed at the boundary portion from being peeled, and to prevent the film 220 and the metal layer 110 from being peeled while securing bonding force between the film 220 and the metal layer 110 for a long time.

In addition, the printing layer 240 having a color and texture similar to those of the deposition layer 210 is formed in a portion from which metal deposition has been removed, thereby realizing a sense of unity and an external aesthetic sense.

What is claimed is:

1. An exterior panel for a home appliance comprising:
    a base layer made of a metal material;
    a deposition layer disposed at a center region of an upper surface of the base layer and made of a metal material;
    a printing layer that is in contact with a side surface of the deposition layer and that is disposed at an edge region of the upper surface of the base layer where the deposition layer is not disposed, the edge region being disposed outside of the center region; and
    a coating layer disposed on the deposition layer and the printing layer, the coating layer being recessed further to the printing layer than to the deposition layer such that a lower surface of the coating layer is in contact with an upper surface of the deposition layer and an upper surface of the printing layer,
    wherein a material of the printing layer is the same as or similar to the metal material of the deposition layer, and
    wherein a color of the printing layer is the same as or similar to a color of the deposition layer.

2. The exterior panel for the home appliance of claim 1, wherein the printing layer includes a silver material.

3. The exterior panel for the home appliance of claim 1, wherein the base layer includes:
a metal layer; and
an adhesive layer disposed on the metal layer.

4. The exterior panel for the home appliance of claim 3, wherein the metal layer is made from a galvanized steel sheet (GI).

5. The exterior panel for the home appliance of claim 1, wherein hairlines are defined on the base layer or the coating layer.

6. The exterior panel for the home appliance of claim 1, wherein the printing layer is made of the metal material of the deposition layer, and
wherein the color of the printing layer is equal to the color of the deposition layer.

7. The exterior panel for the home appliance of claim 1, wherein the printing layer defines an outer boundary of the exterior panel such that the deposition layer is disposed inward of the printing layer.

8. The exterior panel for the home appliance of claim 1, wherein the lower surface of the coating layer is stepped and faces the deposition layer and the printing layer.

9. The exterior panel for the home appliance of claim 1, wherein the lower surface of the coating layer is recessed further to the printing layer than to the deposition layer.

10. The exterior panel for the home appliance of claim 9, wherein an upper surface of the coating layer is recessed further toward the printing layer than toward the deposition layer.

11. A method of manufacturing an exterior panel for a home appliance, the method comprising:
printing a predetermined pattern on a surface of a film using a strippable paint;
depositing a deposition layer that covers the surface of the film and the strippable paint, the deposition layer being made of a metal material;
removing the strippable paint and the deposition layer on the strippable paint; and
laminating a base layer on the surface of the film,
wherein printing the predetermined pattern comprises:
printing a printing layer on the surface of the film to define the predetermined pattern, and
printing the strippable paint on the predetermined pattern,
wherein a material of the printing layer is the same as or similar to the metal material of the deposition layer, and
wherein a color of the printing layer is the same as or similar to a color of the deposition layer.

12. The method of claim 11, wherein the printing layer includes a silver material.

13. The method of claim 11, further comprising:
before printing the predetermined pattern on the surface of the film, defining hairlines on the film.

14. The method of claim 11, wherein removing the strippable paint comprises performing a washing method.

15. The method of claim 11, wherein removing the strippable paint and the deposition layer comprises:
attaching an adhesive tape to a first surface including the strippable paint and the deposition layer on the strippable paint; and
detaching the adhesive tape from the first surface to thereby detach the strippable paint from the printing layer.

16. The method of claim 11, wherein removing the strippable paint and the deposition layer comprises:
masking a portion of the deposition layer; and
performing immersion in an etching solution after masking the portion of the deposition layer.

17. The method of claim 11, further comprising:
after removing the strippable paint and the deposition layer on the strippable paint, coating a primer on the deposition layer and the printing layer that are disposed on the surface of the film; and
coating a laminate adhesive on the base layer, the laminate adhesive attaching the base layer to the primer coated on the deposition layer and the printing layer.

18. The method of claim 11, further comprising:
after laminating the base layer, cutting the film into a plurality of pieces.

19. The method of claim 11, wherein the printing layer is made of the metal material of the deposition layer, and
wherein the color of the printing layer is equal to the color of the deposition layer.

20. The method of claim 11, wherein the printing layer defines an outer boundary of the exterior panel such that the deposition layer is disposed inward of the printing layer.

* * * * *